April 25, 1933.  K. E. PEILER  1,905,494
APPARATUS FOR SUPPLYING MOLTEN GLASS
Filed May 16, 1931  2 Sheets-Sheet 1

Witness:
G. A. Deberg.
A. A. Horn

Inventor:
Karl E. Peiler
by Brown & Parham
Attorneys.

April 25, 1933.  K. E. PEILER  1,905,494
APPARATUS FOR SUPPLYING MOLTEN GLASS
Filed May 16, 1931  2 Sheets-Sheet 2

Witness:
G. A. Duburg.
A. A. Horn.

Inventor;
Karl E. Peiler
by Brown & Parham
Attorneys.

Patented Apr. 25, 1933

1,905,494

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

APPARATUS FOR SUPPLYING MOLTEN GLASS

Application filed May 16, 1931. Serial No. 537,811.

This invention relates to apparatus for supplying molten glass and has particular relation to a container for a pool of molten glass from which charges of glass are gathered by suction by molds which periodically dip in the glass, the container having means associated therewith for maintaining the pool of glass at the proper temperature and in the desired condition for the gathering of charges.

Heretofore, difficulty has been experienced in the operation of suction gathering apparatus due to the suction gathering mold being unduly heated in the gathering position over the gathering pool, by the heat applied to the gathering pool. In the operation of suction gathering machines, as in all glass forming machines, it is necessary to maintain the molds at the proper temperature, in order that the glass shaped therein in turn will be maintained at the proper temperature, for fabrication. If the molds are unduly heated, the glass in the mold is made too fluid for fabrication, and the articles shaped in the mold do not properly retain their form, and hence special provision usually must be made for cooling the molds of suction gathering apparatus.

It is the general object of the present invention to provide means associated with a gathering pool which serves to prevent heat applied to the gathering pool, as for example, inwardly of the gathering point, from coming into contact with the molds as they move into or through, or out of the gathering position. That may be accomplished by the provision of a plurality of heat obstructing members, which normally may be held out of heat obstructing position to permit heat freely to pass from an enclosed part of the gathering pool to the exposed part thereof to condition the glass in the exposed part of the pool, but which may be moved periodically and successively into heat obstructing position as the molds move over the pool. The members may so be operated in timed relation to the movement of the molds so that at least one of said members always is in heat obstructing position as each mold moves over the exposed part of the gathering pool.

Other objects of the invention will be pointed out in the detailed description of the invention which follows, or will become apparent from such description.

In order that the invention may be more readily understood, and its manifold advantages appreciated, reference should be had to the accompanying drawings in which a convenient embodiment of the invention is illustrated.

Figure 1:
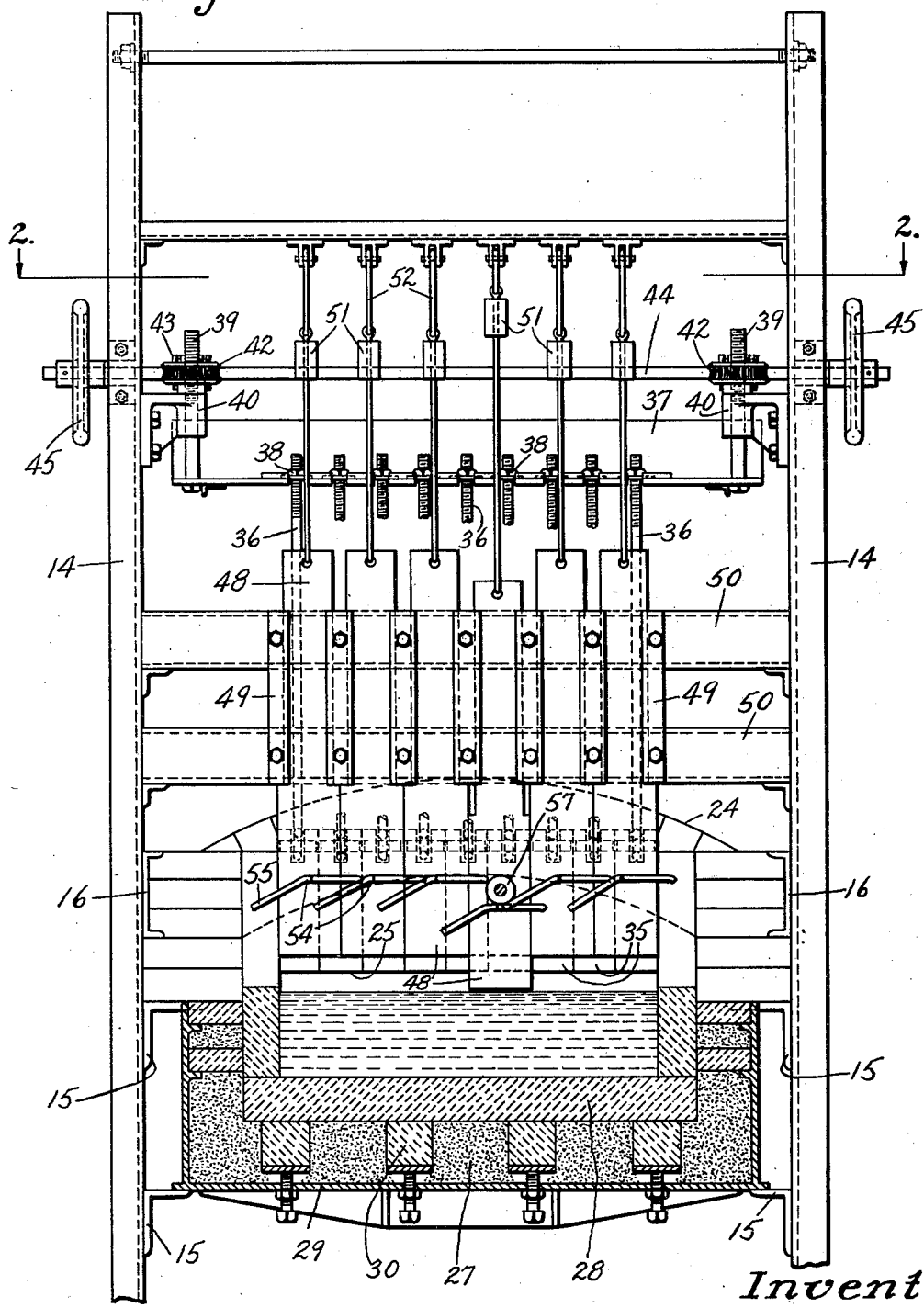
Figure 1 is a view in front elevation and vertical transverse section of a gathering bay, provided with heat obstructing means of the invention.

The invention as shown in the drawings is associated with a forehearth or gathering bay of a glass tank, of the same general character as that disclosed in my prior Patent 1,893,060, granted January 3, 1933. The forehearth structure is tied by vertical stays 14 which support angle irons 15, which in turn carry and hold the forehearth structure, and which stays also support channel irons 16 which serve to retain in position super-structure associated with the forehearth.

Figure 2:
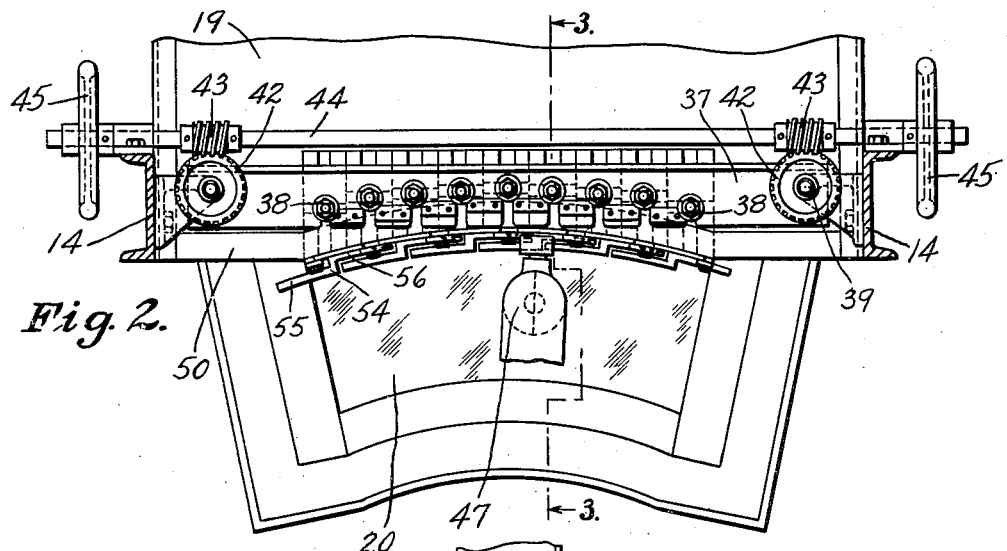
Fig. 2 is a view in horizontal sectional top plan of the construction shown in Fig. 1, and taken substantially on the line 2—2 of Fig. 1, parts of the apparatus being omitted for clarity.
Figure 3:
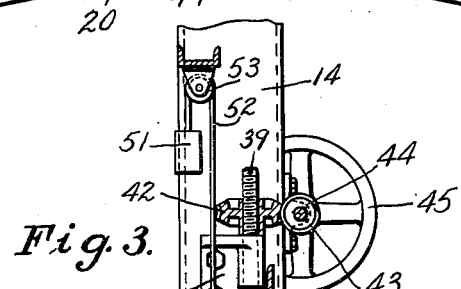
Fig. 3 is a view in vertical longitudinal section of the construction shown in Figs. 1 and 2, and taken substantially on the line 3—3 of Fig. 2.

The forehearth comprises a basin or receptacle of refractory and glass resisting material, the gathering portion of which is shown at 20, Fig. 2, rearwardly of which is the temperature regulating section shown partially at 19, Figs. 2 and 3. Such heat regulating chamber is covered or enclosed by an arch roof 24, and the front end of the chamber is partially closed by a barrier or wall 25, or what may be termed a jack-arch.

Suitable means, not shown, may be associated with the chamber 19 for heating and conditioning glass of the gathering pool, as for example, that disclosed in my above identified patent or in my Patent No. 1,760,254, May 27, 1930.

The forward portion of the basin or gathering bay, preferably is insulated as indicated at 27, such insulation being disposed in the space between the blocks 28 of the basin and a metal casing 29 which rests on and is held in position by the angle irons 15. Refractory blocks 30, supported as shown, may serve to hold the basin in properly spaced relation to the metal casing 29.

The barrier 25, is composed of a series of refractory blocks 35, suspended side by side by individual threaded rods 36 which extend upwarly through a bearing bar 37 and are provided at their upper ends with adjusting nuts 38. The bar 37 is carried by a pair of screw-threaded rods 39 in brackets 40 on stays 14. The rods 39 are screw-threaded in worm wheels 42 which mesh with worms 43 on horizontal shaft 44, journaled in the stays 14 and provided with hand wheels 45. Thus it will be seen that by turning the hand wheels 45, the barrier or wall 25 may be adjusted as a whole to change the height of the gap between the bottom of the wall and the surface of glass in the gathering pool. Moreover, if desired, the blocks 35 of the wall may individually be adjusted by means of the nuts 38. Such adjustment may be employed for varying the passage of heat or radiation from the fire space or heating chamber 19, out to and over the gathering bay and particularly to the surface of the glass in the gathering bay. It also permits the adjustment of the draft under the barrier or wall 25 in conjunction with other draft controls which, though not shown, may be provided. The wall also may be adjusted vertically upon change in the level of the glass in the pool.

The structure so far described may be identical with that disclosed in my copending application above referred to.

The gathering bay or the part 20 of the forehearth construction leaves a part of the pool exposed so that the molds of a glass forming machine may be dipped therein to gather charges. One of the molds of such a machine is indicated at 47, Figs. 2 and 3, the mold thus shown being one of a series of molds of the glass shaping machine shown in the patent to Owens, No. 1,245,262 November 6, 1917, and operated as disclosed in that patent.

As the molds, such as that indicated at 47, are successively dipped into the glass, heat passing under the barrier 25 is apt to unduly heat the molds, especially if the exposed part of the gathering pool is heated by means of a sting-out flame as disclosed in my copending application above referred to. In order to prevent such heating of the molds, the following means is provided:

A series of vertical baffle plates 48 are mounted side by side just in front of and if desired in sliding contact with, the outer face of the wall or jack-arch 25. The baffle plates 48 which may be made of chrome-nickel-iron alloy or the like, are mounted between guides 49 carried by horizontal cross pieces 50, the ends of which are secured to the stays 14. The baffle plates normally are held in raised position to permit passage of heat beneath the wall or jack-arch 25, outwardly across the surface of the exposed part of the gathering pool, by means of weights 51 attached to cords 52 passing over pulleys 53 and connected to the upper ends of the baffle plates 48.

The baffle plates being thus supported, may successively be moved downwardly by suitable means to a position just short of where the bottom ends thereof would contact with the glass in timed relation to the movement of the molds over the surface of the exposed part of the pool. Hence, prevention of the passage of heat from chamber 19 into contact with the molds is insured.

Figure 4:
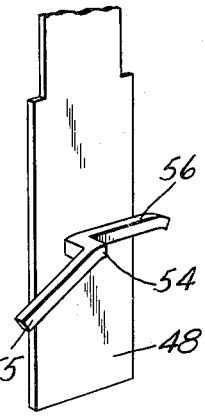
Fig. 4 is an enlarged view in perspective of one of the heat obstructing members and its associated operating means, shown in Figs 1 to 3 inclusive.

In the construction shown, the means for so moving the baffle plates downwardly includes separate cam members 54, secured to the outer faces of the baffle plates. As best shown in Figs. 2 and 4, each cam member comprises an upwardly inclined portion 55 and a re-entrant horizontal portion 56 by means of which the cam member as a whole may be secured to the baffle plate with which it is associated, in suitable manner.

The cam members 54 are adapted to be engaged by a roller 57 which as shown in Figs. 2 and 3 is carried by the support for the mold 47, in such a position or at such a level that as the mold is moved toward the gathering position, the roller 57 will engage the lower end of the inclined part 55 of the cam member associated with the first baffle plate, as a result of which the baffle plate 48 will be depressed to shut off the passage of heat beneath the jack-arch 25 into engagement with the mold. As the mold unit continues to move, the first baffle plate will be held in depressed position by the engagement of roller 57 with the horizontal portion 56 of the cam member 54. In that manner, the various baffle plates 48 successively are depressed to provide an obstruction which advances with the mold unit as the unit moves over the gathering pool. In fact, the horizontal portions 56 and the advanced inclined portions 55 of the members 54 may be horizontally co-extensive as shown in Fig. 2, for simultaneous engagement of two of the cam members of adjacent baffle plates by roller 57 to insure that at least one of the baffle plate members always will be in downwardly projected position as the mold unit moves over the gathering pool. Thus, as the roller 57 leaves the rear end of a horizontal portion 56 of cam member 54, it already will have moved over the portion 55 of the succeeding cam member to depress the succeeding baffle plate before the preceding baffle plate is released and raised by its weight 51 to open position. Therefore, as the mold moves between the endmost baffle plates, two baffle plates will at times protect the mold from heat.

From the foregoing it will be seen that the invention provides means for maintaining the molds of a suction machine in relatively cool condition, by preventing the passage of heat from the heating space of the forehearth into contact with the molds, while at the same time permitting substantially a continuous passage of heat across the surface of the exposed part of the pool, except insofar as such passage of heat is obstructed for the protection of the molds. In other words, the apparatus of the invention permits free application of heat from the heating space of the forehearth to the entire surface of the exposed part of the gathering pool in the intervals between gathering operations, and while preventing the passage of heat into contact with the molds during gathering operations, permits application of heat to part of the pool at the time that the molds move over the pool. Moreover, the arrangement of the invention is especially convenient inasmuch as it may be automatic in operation, and directly controlled by the movement of the molds themselves over the gathering pool.

It will be understood that the invention is not limited to the specific embodiment thereof shown in the drawings, but that various changes may be made in the details of construction of the illustrated embodiment without departing from the scope of the appended claims.

Having thus described my invention, what I desire to claim and secure by Letters Patent is:

1. In combination with a container for a pool of molten glass, a mold unit adapted to be dipped to gather charges of glass periodically from the surface of the pool, a plurality of heat obstructing members, means holding said members out of contact with the glass at all times, and means operable in timed relation to the movement of the mold to move said members respectively into and out of heat obstructing position in succession.

2. In combination with a container for a pool of molten glass, a mold adapted to be dipped to gather charges of glass periodically from the surface of the pool, a plurality of heat obstructing members, means holding said members out of contact with the glass at all times, and means controlled in timed relation to the movement of the mold to move said respective members into and out of heat obstructing position consecutively.

3. In combination with a container for a pool of molten glass, a heating chamber associated with said container for applying heat to the surface of the pool in the container, a plurality of baffle plates, means holding said baffle plates out of contact with the glass at all times, and between the heating chamber and the pool, and means for periodically moving said baffle plates into and out of position to obstruct the passage of heat from the chamber to the container.

4. In combination with a container for a pool of molten glass, a heating chamber associated with said container for applying heat to the surface of the glass in said container, a plurality of baffle plates, means holding said baffle plates out of glass contact at all times, a mold adapted to be dipped to gather charges of glass from the surface of the pool in the container, and means operable in timed relation to the gathering operations of the mold, for periodically and successively moving said baffle plates into a position to obstruct the passage of heat from the heating chamber into contact with the mold during the gathering operations, and for subsequently returning the baffle plates to non-obstructing position.

5. In combination with a container for a pool of molten glass, a heating chamber associated with said container for applying heat to the surface of the glass therein, a mold adapted to gather charges of glass periodically from the surface of the pool in the container, a plurality of baffle plates interposed between the heating chamber and the pool from which charges are gathered, and means operating in response to the movement of the mold during the gathering operations thereof, for moving the baffle plates into and out of position to obstruct the passage of heat from the heating chamber into contact with the mold.

6. In combination with a container for a body of molten glass, a heating chamber at least partially enclosing said container, a plurality of heat obstructing members for at least partially confining heat to the chamber, said members being arranged side by side and held out of glass contact at all times, and automatic means for successively moving said members into and out of heat-obstructing position.

7. In combination with a forehearth, an extension on said forehearth for providing an exposed gathering pool, a jack-arch interposed between the forehearth and the extension, a plurality of heat obstructing members associated with the jack-arch, and means for periodically moving said heat obstructing members into and out of heat obstructing position.

8. In combination with a container for a pool of molten glass, a heating chamber associated with said container for applying heat to the surface of the glass in said container, a jack-arch interposed between the heating chamber and the container, a plurality of baffle plates associated with the jack-arch, and means for periodically and successively moving the baffle plates into and out of position to obstruct the passage of heat from the heating chamber to the container.

9. In combination with a container for a pool of molten glass, a heating chamber associated with said container for applying heat to the surface of the glass therein, a plurality of baffle plates interposed between the heating chamber and the container, and means for periodically and successively moving said baffle plates into and out of position to obstruct passage of heat from the heating chamber to the surface of the glass in the container.

10. In combination with a container for a pool of molten glass, a mold adapted to be moved periodically over the pool to gather charges therefrom, a heating chamber from which heat is applied to the surface of the pool, plural heat obstructing means interposed between the surface of the gathering pool and the heating chamber, and means for moving said heat obstructing means into operative position to protect the mold from the heat applied to the pool during its movement over the pool, and for moving said means to inoperative position for the application of heat to a part of the pool during the movement of the mold over the pool.

Signed at Hartford, Connecticut, this 11th day of May, 1931.

KARL E. PEILER.